ical properties.

UNITED STATES PATENT OFFICE 3,023,174
Patented Feb. 27, 1962

3,023,174
EPOXIDIZED HYDROAROMATIC COMPOUNDS
Hans Batzer, Arlesheim, and Erwin Nikles, Basel, Switzerland, assignors to Ciba Limited, Basel, Switzerland, a firm of Switzerland
No Drawing. Filed July 21, 1959, Ser. No. 828,471
Claims priority, application Switzerland July 22, 1958
7 Claims. (Cl. 260—2)

This invention relates to epoxidized hydroaromatic compounds and particularly to new ketals and acetals containing epoxide groups and to processes for the production thereof.

According to the present invention there are provided, as a new class of epoxy compounds, ketals and acetals containing epoxide groups and of the general Formula I (I)

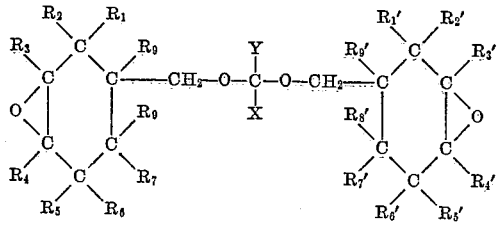

in which $R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_8$, $R_8'$, $R_9$ and $R_9'$ taken individually represent monovalent substituents, such as halogen atoms, alkoxy groups, or aliphatic, cycloaliphatic, araliphatic or aromatic hydrocarbon radicals, (e.g. lower alkyl radicals i.e. alkyl radicals of 1 to 4 carbon atoms), or represent hydrogen atoms, and $R_1$ and $R_5$ taken together or $R_1'$ and $R_5'$ taken together represent a divalent substituent, such as a methylene group, and X and Y represent hydrogen atoms or monovalent organic radicals, such as aliphatic, cycloaliphatic, araliphatic, aromatic or heterocyclic radicals or one of X and Y represents a direct bond or a divalent grouping linking the structure shown to the median carbon atom contained in a repetition of said structure.

According to a further aspect of this invention the compounds of Formula I are prepared by treating with epoxidizing agents hydroaromatic acetals and ketals of the general Formula II

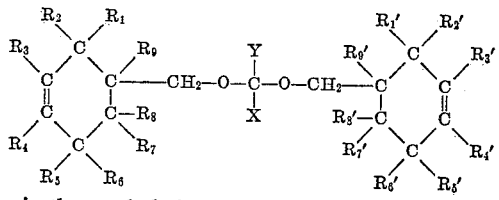

wherein the symbols have the meanings assigned to them above.

The epoxidation of the C=C double bonds in the cyclohexene rings of the compounds of general Formula II is effected by conventional methods, advantageously by means of organic per acids, such as peracetic acid, perbenzoic acid, peradipic acid, and monoperphthalic acid. It is also possible to use hypochlorous acid as epoxidizing agent, HOCl being added in a first stage to the double bond and the epoxide group being formed in the second stage by the action of agents splitting off HCl, for example strong alkalis.

Especially advantageous properties are possessed by the formals containing epoxide groups derived from starting materials of the general Formula II wherein X and Y are hydrogen atoms and the other symbols have the meanings assigned to them above.

The most easily obtainable formals containing epoxide groups are those of the general Formula III

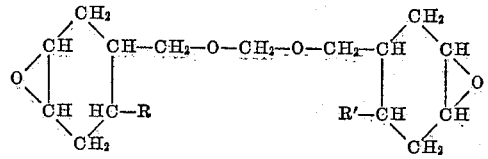

in which R and R' represent hydrogen atoms or lower alkyl groups.

In the unhardened state, these epoxides constitute almost crystal-clear liquids of comparatively low viscosity which can be converted by suitable hardening agents, such as for example dicarboxylic acid anhydrides, into hardened products with excellent industrial properties.

These preferred formals containing epoxide groups are obtained by epoxidizing hydroaromatic formals of general Formula II and X and Y are hydrogen or of the general Formula IV

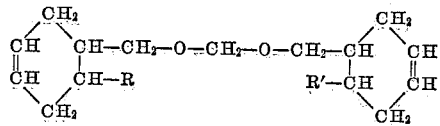

where the symbols have the meanings assigned to them above.

The hydroaromatic acetals and ketals used as starting compounds in the process of the invention can be obtained by known acetalization methods, for example by condensing at least 2 mols of an alcohol of the general Formula V

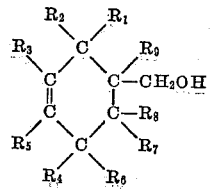

or a mixture of two or more such alcohols, with 1 mol of an aldehyde or ketone of the Formula VI

the various symbols having the meanings assigned to them above.

Depending on whether there are initially used a homogeneous alcohol of the Formula V or a mixture of two or more such alcohols, there are obtained acetals or ketals of symmetrical structure or mixtures of the symmetrical acetals or ketals with those of unsymmetrical structure.

The acetalization can take place according to methods known per se, as for example by heating an alcohol of the Formula V together with the aldehyde or ketone of the Formula VI in the prescribed molar ratio in the presence of an acid catalyst, such as for example hydrochloric acid or toluene p-sulfonic acid. The alcohol may be present in excess.

The unsaturated cyclic alcohols of Formula V are derivatives of $\Delta^3$-tetrahydrobenzene. Examples are $\Delta^3$-tetrahydrobenzylalcohol, 6-methyl-$\Delta^3$-tetrahydrobenzyl alcohol, 2,4,6-trimethyl-$\Delta^3$-tetrahydrobenzyl alcohol, 1,5-endomethylene-$\Delta^3$-tetrahydrobenzyl alcohol and 4-chloro-$\Delta^3$-tetrahydrobenzyl alcohol.

The aldehydes or ketones which are acetalized and ketalized respectively, with the alcohols of Formula V, may be aliphatic, cycloaliphatic, araliphatic, aromatic or heterocyclic. Examples of aliphatic aldehydes and ketones are acetaldehyde, propionaldehyde, butyraldehyde, valeraldehyde, enanthaldehyde, caproaldehyde, caprylaldehyde, lauric aldehyde, stearic aldehyde and more especially formaldehyde or paraformaldehyde, acrolein, crotonaldehyde, propiolaldehyde, glyoxal, succinaldehyde, maleic aldehyde, chloral, monochloracetaldehyde, aldol, acetone, methylethyl ketone, methylpropyl ketone, methylbutyl ketone, diethyl ketone, ethylbutyl ketone, ethyliso-amyl ketone, methylvinyl ketone, methylpropenyl ketone, mesityl oxide, crotylidene acetone, phorone, acetonyl acetone, acetol, acetoin, diacetone alcohol and chloracetone.

Examples of cycloaliphatic aldehydes and ketones are $\Delta^3$-tetrahydrobenzaldehyde, 6-methyl - $\Delta^3$ - tetrahydrobenzaldehyde, hexahydrobenzaldehyde; cyclopentanone, cyclohexanone, camphor, fenchone, isophorone, ionone, carvone.

Examples of araliphatic aldehydes and ketones are phenyl acetaldehyde, cinnamaldehyde, acetophenone, acrylophenone, benzylidene acetone, methyl-2-naphthyl ketone.

Examples of aromatic aldehydes and ketones are benzaldehyde, p-tolualdehyde, o-chlorobenzaldehyde, o-nitrobenzaldehyde, p-nitrobenzaldehyde, salicylaldehyde, anisaldehyde, vanillin, piperonal, benzophenone, benzoin and 9-fluorenone.

Examples of heterocyclic aldehydes and ketones are furfural, tetrahydrofurfural, xanthone and flavone.

When using dialdehydes or diketones, such as glyoxal or acetonyl acetone, as starting materials, it is possible to obtain acetals or ketals with more than two unsaturated cyclohexene radicals, i.e. the radical X or Y in general Formula I may, for example, represent an acetal or ketal radical of the general Formula VII

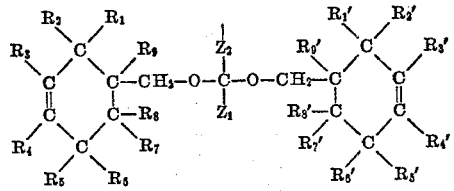

wherein $Z_1$ represents a hydrogen atom or a monovalent organic radical, such as an aliphatic, cycloaliphatic, araliphatic or heterocyclic radical, $Z_2$ represents a direct bond or a divalent organic radical of the aliphatic, cycloaliphatic, araliphatic, aromatic or heterocyclic series, and the other symbols have the meanings assigned to them hereinbefore.

The epoxidized acetals or ketals according to the invention may also be represented by the general Formula VIII

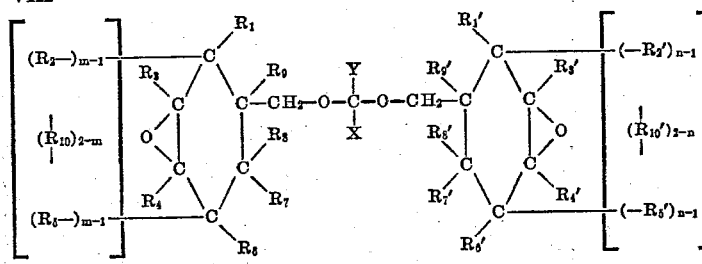

in which $m$ and $n$ each represents a whole number of at the most 2, $R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_8$, $R_8'$, $R_9$ and $R_9'$ are of the group consisting of hydrogen atom, halogen atom, alkoxy group, aliphatic hydrocarbon radical, cycloaliphatic hydrocarbon radical, araliphatic hydrocarbon radical and aromatic hydrocarbon radical, $R_{10}$ and $R_{10}'$ each stands for an alkylene group and X and Y are of the group consisting of hydrogen atom, aliphatic hydrocarbon radical, cycloaliphatic radical, araliphatic radical, aromatic radical, and heterocyclic radicals.

These epoxidized acetals or ketals according to the invention react with the usual hardeners for epoxide compounds. They can be cross-linked or cured by addition of such hardeners in a manner analogous to other polyfunctional epoxide compounds or epoxide resins. Either basic or acidic compounds may be employed as hardeners, the latter being generally preferred. The following are exemplary of suitable hardeners: amines or amides, such as aliphatic and aromatic primary, secondary and tertiary amines, for example monobutylamine, dibutylamine and tributylamine, p-phenylene diamine, bis-[p-aminophenyl]-methane, ethylene diamine, N,N-diethyl ethylene diamine, tetra-[hydroxyethyl]-diethylene-triamine, diethylene triamine, triethylene tetramine, tetraethylene pentamine, trimethylamine, diethylamine, triethanolamine, Mannich bases, piperidine, piperazine, guanidine and guanidine derivatives, such as phenyl diguanidine, diphenyl guanidine, dicyandiamide, anilineformaldehyde resins, urea-formaldehyde resins, melamine-formaldehyde resins, polymers of amino-stryenes, polyamides, for example those from aliphatic polyamines and dimerized or trimerized unsaturated fatty acids, isocyanates, isothiocyanates; polyhydric phenols, for example resorcinol, hydroquinone, quinone, phenol-aldehyde resins, oil-modified phenolaldehyde resins, reaction products of aluminum alcoholates or phenolates with tautomerically reacting compounds of the type of acetoacetic ester, Friedel-Crafts catalysts, for example $AlCl_3$, $SbCl_3$, $SnCl_4$, $FeCl_3$, $ZnCl_2$, $BF_3$ and their complexes with organic compounds; phosphoric acid.

As hardeners, it is preferred to use polybasic carboxylic acids and their anhydrides, for example phthalic anhydride, methyl endomethylene tetrahydrophthalic anhydride or endomethylene tetrahydrophthalic anhydride or mixtures thereof; maleic or succinic anhydrides. Accelerators such as tertiary amines, and polyhydroxyl compounds such as hexanetriol (as hereafter explained) may be present during the hardening operation.

It has been found that in the hardening of the epoxide resins according to the invention with carboxylic acid anhydrides, it is advantageous to use only about 0.3 to 0.9 gram equivalent of anhydride group to 1 gram equivalent of epoxide group.

It has further been found that for one series of industrial applications, the properties of the hardened epoxidized acetals or ketals according to the invention are favorably influenced if they contain a proportion of the corresponding acetals or ketals of which the epoxide groups have been wholly or partially saponified to hydroxyl groups. Since the corresponding wholly or only partially hydrolyzed epoxides which are desirable as an addition are generally also simultaneously formed because of side reactions in addition to the di-epoxides or poly-epoxides when the epoxidation is carried out in accordance with the invention, it is generally advisable not to isolate the pure di-epoxides or poly-epoxides from the reaction mixture.

The expression "hardening" as used herein means the conversion of the foregoing epoxide compounds to insoluble and infusible resins.

The present invention accordingly also provides hardenable mixtures which contain the epoxidized acetals or ketals of general Formula I and also hardening agents therefor, preferably dicarboxylic or polycarboxylic acid anhydrides.

The hardenable mixtures according to the invention advantageously contain, as indicated above, a proportion of the corresponding acetals or ketals of which the epoxide groups are wholly or partially saponified to hydroxyl groups, and/or polyhydroxyl compounds such as hexanetriol. Other polyepoxides can of course also be added to the hardenable epoxide compounds, such as for example monoglycidyl or polyglycidyl ethers of monoalcohols or polyalcohols (such as butyl alcohol, 1,4-butanediol or glycerine) or monophenols or polyphenols (such as resorcinol, bis-[4-hydroxyphenyl]-dimethyl methane or condensation products of aldehydes with phenols (novolaks)) or polyglycidyl esters of polycarboxylic acids such as phthalic acid, or aminopolyepoxides such as those which are, for example, obtained by dehydrohalogenation of reaction products of epihalohydrins and primary or secondary amines (such as n-butylamine, aniline or 4,4'-di-(monomethylamino)-diphenyl methane).

The hardenable epoxidized acetals or ketals or their mixtures with hardeners may have added thereto fillers, plasticisers, coloring substances and the like at any stage prior to the hardening. Asphalt, bitumen, glass fibers, mica, powdered quartz, cellulose, kaolin, finely divided silica (aerosil) or metal powders can be used as extenders and fillers.

The mixtures of the compounds of general Formula I according to the invention and the hardeners can be used in the unfilled or filled condition, as well as in solution or emulsion, as textile auxiliaries, lamination resins, lacquers, coating agents, dipping resins, casting resins, brushing, filling and trowelling compounds, adhesives and the like or for the production of such agents. The hardened compounds are especially valuable as insulating materials for the electrical industry.

The invention is illustrated by the following examples, in which parts represent parts by weight and percentages represent percentages by weight, the ratio between parts by weight and parts by volume is the same as between kilograms and liters and the temperatures are given in degrees centigrade.

EXAMPLE 1

*Bis-($\Delta^3$-Tetrahydrobenzyl)-Formal*

In a cyclic distillation apparatus (as described by H. Batzer and collaborators in "Makromolekulare Chemie," 7 (1951), pages 84–85), 1221 parts of $\Delta^3$-tetrahydrobenzyl alcohol are run into a boiling mixture of 242 parts of paraformaldehyde and 5 parts of toluene-p-sulfonic acid in 4000 parts by volume of benzene. The water formed in the reaction is separated in a water separator. After boiling for 5 hours, 124 parts by volume of water containing formaldehyde are separated out and the reaction mixture constitutes a homogeneous solution. The solvent is distilled off and there is added to the residue 5 parts of anhydrous sodium acetate. The product is then filtered and distilled in the vacuum created by an evacuating apparatus water jet (so-called water jet vacuum). There are thus obtained 1199 parts of bis-($\Delta^3$-tetrahydrobenzyl)-formal, B.P. 173–176°/16 mm.

*Analysis*—$C_{15}H_{24}O_2$.—Calculated: C, 76.22%; H, 10.25%. Found: C, 76.01%; H, 10.07%.

*Bis-(3,4-Epoxy-Hexahydrobenzyl)-Formal*

(a) 785 parts of the bis-($\Delta^3$-tetrahydrobenzyl)-formal as previously described are dissolved in 2000 parts by volume of benzene. 100 parts of anhydrous sodium acetate are added to the solution and 1450 parts of 42% peracetic acid are added dropwise in 50 minutes while stirring and cooling with ice. The mixture is thereafter stirred for another 105 minutes and kept at 30° by occasional cooling. After this time, the theoretical quantity of peracetic acid has been consumed.

The lower aqueous phase is separated and the upper phase is washed with three times 600 parts of water and with 800 and 200 parts by volume of 2 N-sodium carbonate solution. The combined aqueous solutions are extracted with 1500 parts by volume of benzene. The combined benzene solutions are dried over sodium sulfate, filtered and concentrated by evaporation. There are obtained 774 parts of a liquid, crystal-clear epoxide with a content of 5.9 epoxide equivalents per kg.

For determining the epoxide content, about 1 g. of epoxide is dissolved in 30 cc. of glacial acetic acid and titrated with 0.5 N hydrogen bromide in glacial acetic acid in the presence of crystal violet until the color of the indicator changes to bluish-green. A consumption of 2 cc. of 0.5 N HBr-solution corresponds to 1 epoxide equivalent per kg.

(b) 366 parts of the bis-($\Delta^3$-tetrahydrobenzyl)-formal as described above are dissolved in 3000 parts by volume of benzene. After adding 25 parts of anhydrous sodium acetate, 850 parts of 40% peracetic acid are added dropwise during 2½ hours while stirring. The temperature is kept at 30° by external cooling. The reaction mixture is stirred for another 5 hours at 30°. Thereafter, the bottom aqueous phase is separated and the benzene layer is washed twice with 1000 parts of water, 400 parts by volume of ice-cold 2 N-sodium hydroxide solution and with potassium acetate solution. The combined aqueous solutions are extracted with 1000 parts by volume of benzene. The combined benzenic solutions are dried for a short time over sodium sulfate, filtered and concentrated by evaporation. The residue is distilled under high vacuum. There are thus obtained 243 parts of a low-viscosity resin, B.P. 171–175°/0.4 mm. Hg with an epoxide content of 7.1 epoxide equivalents per kg.

EXAMPLE 2

*Bis-(6-Methyl-$\Delta^3$-Tetrahydrobenzyl)-Formal*

A mixture of 1260 parts of 6-methyl-$\Delta^3$-tetrahydrobenzyl alcohol, 210 parts of paraformaldehyde, 5 parts of toluene-p-sulfonic acid and 3000 parts by volume of benzene is boiled in a cyclic distillation apparatus. After 7 hours, 118 parts of water containing formaldehyde are separated out. To the benzene solution is added 5 parts of finely powdered anhydrous sodium acetate, and the product is then filtered and the benzene evaporated. The residue on distillation yields 1176 parts of bis-(6-methyl-$\Delta^3$-tetrahydrobenzyl)-formal, B.P. 176–180°/13 mm. Hg.

*Analysis*—$C_{17}H_{28}O_2$.—Calculated: C, 77.22%; H, 10.67%. Found: C, 77.32%; H, 10.43%.

*Bis-(3,4-Epoxy-6-Methyl-Hexahydrobenzyl)-Formal*

110 parts of the previously described bis-(6-methyl-$\Delta^3$-tetrahydrobenzyl)-formal are dissolved in 500 parts by volume of benzene and 10 parts of sodium acetate are added. During 23 minutes, 200 parts of 42% peracetic acid are added dropwise while constantly stirring. The temperature is kept at 30° by cooling with ice. After the mixture has been stirred for another 60 minutes at 30°, the lower aqueous phase is separated. The benzene solution is washed three times with 100 parts of water and twice with 100 parts by volume of 2 N sodium carbonate solution. The combined aqueous solutions are extracted with 200 parts by volume of benzene. The combined benzene solutions are dried over sodium sulfate, filtered and concentrated by evaporation. The residue is freed under high vacuum in a few hours at 100° from the residual solvent. There are thus obtained 116 parts of a thinly liquid resin with an epoxide content of 4.9 epoxide equivalents per kg.

EXAMPLE 3

*Benzaldehyde-Bis-($\Delta^3$-Tetrahydrobenzyl)-Acetal*

112 parts of $\Delta^3$-tetrahydrobenzyl alcohol, 53 parts of benzaldehyde, 1.5 parts of toluene-p-sulfonic acid and 500 parts by volume of benzene are boiled in a cyclic distillation apparatus. During 9 hours, 3.8 parts by volume of water are separated out. After adding 1 part by volume of piperidine, the solvent is evaporated and the residue distilled. There are obtained 60 parts of the product, B.P. 148–166°/0.05 mm. Hg.

*Analysis*—(The analysis preparation was re-distilled, B.P. 141–149°/0.03 mm. Hg), $C_{21}H_{28}O_2$.—Calculated: C, 80.73%; H, 9.03%. Found: C, 80.67%; H, 8.98%.

*Benzaldehyde-Bis-(3,4-Epoxy-Hexahydrobenzyl)-Acetal*

18.7 parts of the previously described benzaldehyde-bis-($\Delta^3$-tetrahydrobenzyl)-acetal (crude product) are mixed with 150 parts by volume of chloroform. 19.3 parts of perbenzoic acid in 340 parts by volume of chloroform are added to the solution. After standing for 14 hours at room temperature, 96% of the theoretical amount of perbenzoic acid is consumed. The chloroform solution is shaken twice with 100 parts by volume of 2 N sodium carbonate solution, dried over sodium sulfate, filtered and concentrated by evaporation. There are thus obtained 19.5 parts of the product, as a resin having an epoxide content of 4.0 epoxide equivalents per kg.

EXAMPLE 4

*Acetaldehyde-Bis-($\Delta^3$-Tetrahydrobenzyl)-Acetal*

75 parts of $\Delta^3$-tetrahydrobenzyl alcohol have added thereto 0.5 part of mercuric oxide and 0.5 part by volume of 40% boron trifluoride ethyletherate. The mixture is heated to 50–55° and 30 parts of vinyl acetate are then added dropwise while stirring. The solution is then left to stand for 16 hours at 60° and 48 hours at room temperature and thereafter it is poured on to 28 g. of sodium carbonate and 125 parts of iced water. The oil which forms is separated out and the aqueous part is extracted with 50 parts by volume of benzene. The oil and the benzene extract are combined, dried over sodium sulfate, filtered and concentrated by evaporation. The residue on distillation yields 38 parts of the product, B.P. 172–180°/15 mm. Hg.

*Analysis*—(The analysis preparation was re-distilled), $C_{16}H_{26}O_2$.—Calculated: C, 76.75%; H, 10.47%. Found: C, 76.68%; H, 10.30%.

*Acetaldehyde-Bis-(3,4-Epoxy-Hexahydrobenzyl)-Acetal*

14.4 parts of the previously described acetaldehyde-bis-($\Delta^3$-tetrahydrobenzyl)-acetal (crude product) are mixed with 75 parts by volume of chloroform. 18.4 parts of perbenzoic acid in approximately 330 parts by volume of chloroform are added to the solution at 10°. The mixture is then left to stand for 2 hours at room temperature and after this time the theoretical quantity of perbenzoic acid is consumed. The chloroform solution is shaken twice with 100 parts by volume of 2 N sodium carbonate solution, dried over sodium sulfate and concentrated by evaporation. 15.9 parts of the product as a liquid resin having an epoxide content of 6.1 epoxide equivalents per kg. are thus obtained.

EXAMPLE 5

*Acetone-Bis-($\Delta^3$-Tetrahydrobenzyl)-Acetal*

50 parts of acetone enol acetate are added dropwise to a mixture of 112 parts of $\Delta^3$-tetrahydrobenzyl alcohol, 0.5 part of mercuric oxide and 0.5 part by volume of 40% boron trifluoride-ethyletherate. The temperature is kept below 56° by cooling. After standing for 6 hours at room temperature, the mixture is poured on to 28 parts of sodium carbonate and 150 parts of ice. The product is extracted twice with 250 parts by volume of benzene and dried over sodium sulfate. The solvent is evaporated and the residue distilled. There are obtained 67 parts of acetone-bis-($\Delta^3$-tetrahydrobenzyl)-acetal, B.P. 155–168°/9 mm. Hg.

*Analysis*—(The analysis preparation was re-distilled, B.P. 161°/9 mm. Hg), $C_{17}H_{28}O_2$.—Calculated: C, 77.22%; H, 10.67%. Found: C, 77.08%; H, 10.69%.

*Epoxide.*—15.8 parts of the previously described acetone-bis-($\Delta^3$-tetrahydrobenzyl)-acetal (crude product) are mixed with 150 parts by volume of chloroform. 20.7 parts of perbenzoic acid in 360 parts by volume of chloroform are added while cooling. The solution is left standing for 14 hours at room temperature and after this time the theoretical quantity of perbenzoic acid is consumed. The chloroform solution is washed twice with 100 parts by volume of N-sodium carbonate solution, dried over sodium sulfate, filtered and evaporated. 16.9 parts of resin with an epoxide content of 4.4 epoxide equivalents per kg. are thus obtained.

EXAMPLE 6

*Bis-(2,5-Endomethylene-$\Delta^3$-Tetrahydrobenzyl)-Formal*

A mixture of 85 parts of 2,5-endomethylene-$\Delta^3$-tetrahydrobenzyl alcohol, 15 parts of paraformaldehyde, 1 part of toluene-p-sulfonic acid and 500 parts by volume of benzene is boiled in a cyclic distillation apparatus. 6.4 parts of water are separated out. To the benzene solution is added 1 part of anhydrous sodium acetate, and the product is filtered and the benzene evaporated. The residue on distillation yields 63 parts of bis-(2,5-endomethylene - $\Delta^3$ - tetrahydrobenzyl) - formal, B.P. 193–198°/13 mm. Hg.

*Analysis*—$C_{17}H_{24}O_2$.—Calculated: C, 78.42%; H, 9.29%. Found: C, 78.17%; H, 9.30%.

*Epoxide.*—43 parts of the previously described bis-(2,5 - endomethylene - $\Delta^3$ - tetrahydrobenzyl)-formal are mixed with 250 parts by volume of benzene and 5 parts of sodium acetate are added. This mixture is epoxidized with stirring during a period of 50 minutes at 30° with 80 parts of 42% peracetic acid. After this time, the theoretical quantity of peracetic acid is consumed. The mixture is worked up as described in the preceding examples and 44 parts of liquid epoxide resin are obtained.

EXAMPLE 7

*Mono-Chloracetaldehyde-Bis-(6-Methyl-$\Delta^3$-Tetrahydrobenzyl)-Acetal*

A mixture of 76.3 parts of chloracetaldehyde diethyl acetal, 126.1 parts of 6-methyl-$\Delta^3$-tetrahydrobenzyl alcohol and 0.5 part of toluene-p-sulfonic acid is heated under normal pressure and the alcohol formed is slowly distilled off through a Raschig column. In the course of two days there are twice added 100 parts by volume of benzene and the benzene similarly distilled off. On distillation of the residue there are obtained 126 parts of chloracetaldehyde-bis-(6-methyl - $\Delta^3$ - tetrahydrobenzyl)-acetal, B.P. 190–200°/12 mm. Hg.

*Analysis*—$C_{18}H_{29}O_2Cl$.—Calculated: C, 69.09%; H, 9.34%. Found: C, 68.90%; H, 9.36%.

*Monochloracetaldehyde-Bis-(3,4-Epoxy-6-Methyl-Hexahydrobenzyl)-Acetal*

62 parts of the previously described chloracetaldehyde-bis-(6-methyl-$\Delta^3$-tetrahydrobenzyl)-acetal are mixed with 500 parts by volume of benzene and 10 parts of sodium acetate are added thereto. 100 parts of 42% peracetic acid are added in portions at 30° to the stirred mixture. After 1½ hours, this is cooled to 0° and worked up as described in the previous examples. There are obtained 43 parts of liquid resin with an epoxide content of 3.8 epoxide equivalents per kg.

EXAMPLE 8

*Glyoxal-Tetra-($\Delta^3$-Tetrahydrobenzyl)-Acetal*

A mixture of 112 parts of $\Delta^3$-tetrahydrobenzyl alcohol, 34 parts of aqueous 32% glyoxal solution, 1 part of toluene-p-sulfonic acid and 500 parts by volume of benzene is boiled in a cyclic distillation apparatus until the separation of water ceases. To the benzene solution is added 1 part of powdered sodium acetate and it is then filtered and evaporated. The residue is freed under high vacuum at 200° from the volatile fractions and 49 parts of the product are left.

*Epoxide.*—35 parts of the acetal described above are dissolved in 400 parts by volume of benzene and caused to react in the presence of 7 parts of sodium acetate with 70 parts of peracetic acid. The theoretical quantity of peracetic acid is consumed in about 2 hours. After working up, there are obtained 38 parts of resin with an epoxide content of 6.1 epoxide equivalents per kg.

EXAMPLE 9

39.5 parts of phthalic acid anhydride (0.45 equivalent of anhydride groups per equivalent of epoxide groups) are dissolved at 120–130° in 100 parts of a polyepoxide resin prepared according to Example 1a and having an epoxide content of 5.9 equivalents of epoxide groups per kg. At 120°, the mixture has a viscosity lower than 10 centipoises and a viscosity of 1500 centipoises after 2¼ hours. A first portion of the mixture is cast in an aluminum mould (40 x 10 x 140 mm.) and hardened for 24 hours at 140°. The casting which is obtained has the following properties:

Impact bending strength_____ 10.2 cm. kg./cm.$^2$.
Bending strength_____ 13.0 kg./mm.$^2$.
Water absorption after 4 days at
  room temperature_____ 0.33%
Martens dimensional stability under
  heat (DIN)_____ 113°.

A second portion of the above mixture is used for producing adhesive joints. For this purpose, degreased and polished aluminum sheets (170 x 25 x 15 mm.; overlap 10 mm.), obtainable under the name "Anticordal B" are adhesively united. The hardening of the adhesive joint is carried out for 24 hours at 140°. The tensile-shear strengths at room temperature of the samples average 1.0 kg./mm.$^2$.

EXAMPLE 10

Samples of the polyepoxide resin (resin A) prepared according to Example 1a as well as a cycloaliphatic epoxide ester resin of the formula:

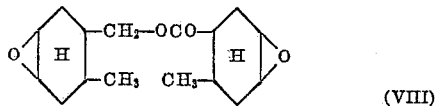

(VIII)

which is obtainable under the trade name EP–201 from the Union Carbide Corporation (resin B) and which has an epoxide content of about 6.4 equivalents of epoxide groups per kg., are melted with phthalic acid anhydride as hardening agent at 120–130°, 0.45, 0.65, 0.75 and 0.90 equivalent of anhydride groups being respectively used to 1 equivalent of epoxide groups. Using the mixtures thus obtained, aluminum sheets are stuck as described in Example 1. The hardening is in each case carried out for 24 hours at 140°. In the following table, the tensile-shear strengths of the adhesive joints measured at room temperature are compared:

| Equivalents of phthalic acid anhydride per equivalent of epoxide groups | Tensile-shear strengths in kg./mm.$^2$ | |
|---|---|---|
| | With resin A | With resin B |
| 0.45 | 1.0 | 0.6 |
| 0.65 | 1.1 | 0.7 |
| 0.75 | 1.1 | 0.75 |
| 0.90 | 0.95 | 0.2 |

EXAMPLE 11

Samples of the epoxide resin (resin A) prepared according to Example 1a and also samples of the polyepoxide resin (resin B) used in Example 10 are melted with a hardener mixture consisting of 65 parts of tetrahydrophthalic acid anhydride and 35 parts of phthalic acid anhydride, 0.85 equivalent of anhydride groups being used per equivalent of epoxide group in each case. Aluminum sheets are stuck with the mixtures, as described in Example 9. The hardening of the adhesive joints is carried out in each case for 10 hours at 150°. The tensile-shear strengths of the adhesive joints, measured at 23° and 120°, respectively, are as set forth in the following table:

| Resin | Tensile-shear strength in kg./mm.$^2$ measured at— | |
|---|---|---|
| | 23° | 120° |
| A | 1.1 | 1.3 |
| B | 0.9 | 0.7 |

EXAMPLE 12

100 parts of the polyepoxide resin prepared according to Example 1a are mixed at room temperature with 0.5 part of tris-(dimethylaminomethyl)-phenol at room temperature.

Methyl endomethylene tetrahydrophthalic acid anhydride is then added at room temperature as hardening agent, 0.45 equivalent of anhydride groups being used per equivalent of epoxide groups with a first sample and 0.75 equivalent of anhydride groups per equivalent of epoxide groups in a second sample. Aluminum sheets are stuck with the two mixtures as described in Example 9. The hardening is carried out in two stages, initially for 16 hours at 120° and then for 24 hours at 160°.

With the first sample, measured at room temperature, an average tensile-shear strength of 1.85 kg./mm.$^2$ is obtained, while with the second sample this value is 1.70 kg./mm.$^2$.

EXAMPLE 13

100 parts of the cycloaliphatic epoxide resin prepared according to Example 1a are mixed at room temperature with 28.6 parts of triethylene tetramine as hardening agent.

A first portion of the mixture is cast in aluminum moulds as described in Example 9 and then hardened for 24 hours at 100°. After 1¾ hours at 100°, the mixture (about 90 g.) has gelled, i.e. the initially liquid mixture has solidified to a gel.

The properties of the hardened castings are as follows:

Impact bending strength _____ 12.4 cm. kg./cm.$^3$.
Bending strength _____ 12.8 kg./mm.$^2$.
Martens dimensional stability under
  heat (DIN) _____ 61°.

Using a second portion of the above mixture, aluminum sheets are stuck as described in Example 9. After hardening for 24 hours at 100°, the adhesive joints show an average tensile-shear strength (measured at room temperature) of 1.45 kg./mm.$^2$.

EXAMPLE 14

26.2 parts of 2,4-dihydroxy-3-hydroxymethyl pentane are mixed at room temperature with 128.6 parts of resin-hardener mixture prepared in Example 13. The mixture (about 90 g.) cast in aluminum moulds as described in Example 9, has gelled in 1¼ hours at 100°. Aluminum sheets are stuck with the above mixture in accordance with Example 9. The average tensile shear strength of the adhesive joints, measured at room temperature, is 1.38 kg./mm.$^2$ after hardening for 24 hours at 100°.

EXAMPLE 15

In a first sample, the epoxide resin prepared according to Example 2 with an epoxide content of 4.9 equivalents of epoxide groups per kg., and in a second sample, the epoxide resin prepared according to Example 4 with an epoxide content of 6.1 equivalents of epoxide groups per kg., are each melted with 0.45 equivalent of phthalic acid anhydride per equivalent of epoxide groups at 120–130°. Aluminum sheets are stuck with the mixtures thus obtained, as described in Example 9. The hardening of the samples is carried out for 24 hours at 140° in each case. The average tensile-shear strength of the adhesive joints, measured at room temperatures, are 1.2 kg./mm.$^2$ with the first sample and 0.95 kg./mm.$^2$ with the second sample.

EXAMPLE 16

(a) 100 parts of the epoxide resin prepared according to Example 5 are melted with 62 parts of phthalic acid anhydride, (b) 100 parts of the epoxide resin prepared according to Example 3 are melted with 44 parts of phthalic acid anhydride, and (c) 100 parts of the epoxide resin prepared according to Example 7 are melted with 41 parts of phthalic acid anhydride, the temperature in each case being 120–130°. On pouring the mixtures with layer thicknesses of $\frac{1}{10}$ mm. and 1 mm. on to glass plates and then hardening, carried out in each case for 24 hours at 140°, the films which are obtained are strongly anchored to the support and are stable after the action for 1 hour at room temperature of 5 N sulfuric acid, 5 N sodium hydroxide solution, water, acetone and chlorobenzene.

What is claimed is:

1. An epoxide of the general formula

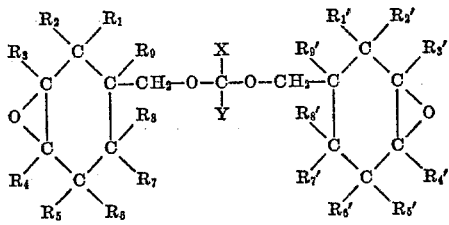

in which $R_1$ and $R_5$ taken together and $R_1'$ and $R_5'$ taken together each forms a member selected from the class consisting of two hydrogen atoms, two lower alkyl radicals and one methylene radical, $R_2$, $R_2'$, $R_3$, $R_3'$, $R_4$, $R_4'$, $R_6$, $R_6'$, $R_7$, $R_7'$, $R_8$, $R_8'$, $R_9$ and $R_9'$ each represents a member selected from the class consisting of a hydrogen atoms and a lower alkyl radical, and X and Y are of the group consisting of hydrogen atoms, saturated aliphatic hydrocarbon radical, halogen alkyl group, saturated cycloaliphatic hydrocarbon radical, aralkyl hydrocarbon radical and aromatic hydrocarbon radical.

2. The epoxidized hydroaromatic formal of the formula

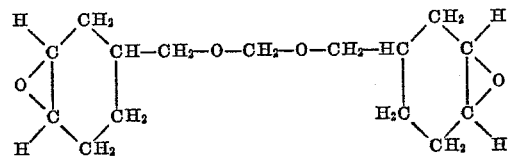

3. The epoxidized hydroaromatic formal of the formula

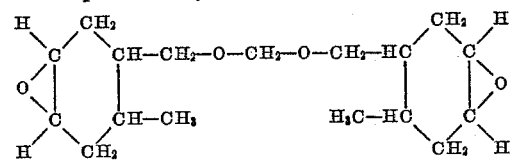

4. The epoxidized hydroaromatic formal of the formula

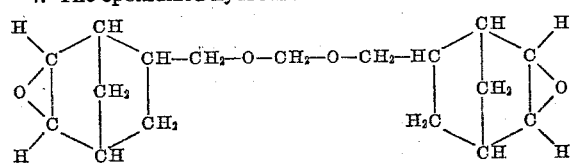

5. A hardenable composition of matter comprising (1) an epoxide of the general formula

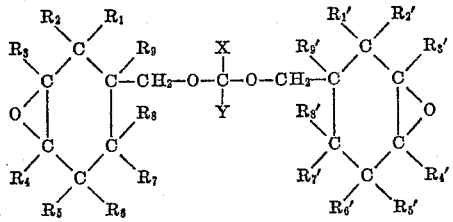

in which $R_1$ and $R_5$ taken together and $R_1'$ and $R_5'$ taken together each forms a member selected from the class consisting of two hydrogen atoms, two lower alkyl radicals and one methylene radical, $R_2$, $R_2'$, $R_3$, $R_3'$, $R_4$, $R_4'$, $R_6$, $R_6'$, $R_7$, $R_7'$, $R_8$, $R_8'$, $R_9$ and $R_9'$ each represents a member selected from the class consisting of a hydrogen atom and a lower alkyl radical, and X and Y are of the group consisting of hydrogen atom, saturated aliphatic hydrocarbon radical, halogen alkyl group, saturated cycloaliphatic hydrocarbon radical, aralkyl hydrocarbon radical and aromatic hydrocarbon radical, and (2) a compound which is reactable with the aforesaid epoxide to convert it into an insoluble and infusible resin.

6. A hardenable composition of matter comprising (1) an epoxide of the general formula

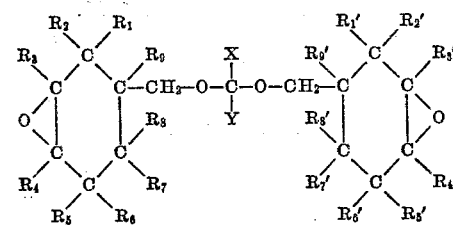

in which $R_1$ and $R_5$ taken together and $R_1'$ and $R_5'$ taken together each forms a member selected from the class consisting of two hydrogen atoms, two lower alkyl radicals and one methylene radical, $R_2$, $R_2'$, $R_3$, $R_3'$, $R_4$, $R_4'$, $R_6$, $R_6'$, $R_7$, $R_7'$, $R_8$, $R_8'$, $R_9$ and $R_9'$ each represents a member selected from the class consisting of a hydrogen atom and a lower alkyl radical, and X and Y are of the group consisting of hydrogen atom, saturated aliphatic hydrocarbon radical, halogen alkyl group, saturated cycloaliphatic hydrocarbon radical, aralkyl hydrocarbon radical and aromatic hydrocarbon radical; and (2) as curing agent therefor in an amount providing 0.3 to 0.9 gram equivalent of epoxide group, an anhydride from the group consisting of anhydrides of dicarboxylic and polycarboxylic acids.

7. A hardenable composition of matter comprising (1) an epoxide of the general formula

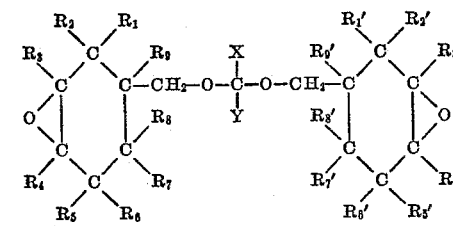

in which $R_1$ and $R_5$ taken together and $R_1'$ and $R_5'$ taken together each forms a member selected from the class consisting of two hydrogen atoms, two lower alkyl radicals and one methylene radical, $R_2$, $R_2'$, $R_3$, $R_3'$, $R_4$, $R_4'$, $R_6$, $R_6'$, $R_7$, $R_7'$, $R_8$, $R_8'$, $R_9$ and $R_9'$ each represents a member selected from the class consisting of a hydrogen atom and a lower alkyl radical, and X and Y are of the group consisting of hydrogen atom, saturated aliphatic hydrocarbon radical, halogen alkyl group, saturated cycloaliphatic hydrocarbon radical, aralkyl hydrocarbon radical and aromatic hydrocarbon radical; (2) as curing agent therefor in an amount providing 0.3 to 0.9 gram equivalent of epoxide group, an anhydride from the group consisting of anhydrides of dicarboxylic and polycarboxylic acids; and (3) an organic polyhydroxy compound from the group consisting of polyhydric aliphatic alcohols and epoxidized acetal corresponding to that present in the composition at least part of the epoxide groups of which are saponified to hydroxyl groups.

References Cited in the file of this patent

UNITED STATES PATENTS

| | | |
|---|---|---|
| 2,895,962 | Fischer | July 21, 1959 |
| 2,917,521 | Phillips et al. | Dec. 15, 1959 |